(12) United States Patent
Rogers et al.

(10) Patent No.: US 11,299,599 B1
(45) Date of Patent: Apr. 12, 2022

(54) RAPID CHEMICAL METHODS FOR RECOVERY OF MATERIALS FROM WASTE SOURCES

(71) Applicants: Charles J. Rogers, Cincinnati, OH (US); Thomas V. Opperman, Newark, OH (US); Bradford J. Rogers, Dacatur, GA (US)

(72) Inventors: Charles J. Rogers, Cincinnati, OH (US); Thomas V. Opperman, Newark, OH (US); Bradford J. Rogers, Dacatur, GA (US)

(73) Assignee: BCD GLOBAL LTD., Newark, OH (US)

(*) Notice: Subject to any disclaimer, the term of this patent is extended or adjusted under 35 U.S.C. 154(b) by 0 days.

(21) Appl. No.: 16/869,130

(22) Filed: May 7, 2020

Related U.S. Application Data

(60) Provisional application No. 62/920,594, filed on May 7, 2019.

(51) Int. Cl.
*C08J 11/24* (2006.01)
*C08J 11/14* (2006.01)

(52) U.S. Cl.
CPC ............. *C08J 11/24* (2013.01); *C08J 11/14* (2013.01); *C08J 2367/02* (2013.01)

(58) Field of Classification Search
USPC ..................................................... 521/40.5
See application file for complete search history.

(56) References Cited

U.S. PATENT DOCUMENTS

| | | | |
|---|---|---|---|
| 3,928,253 A | 12/1975 | Thornton et al. | |
| 4,612,057 A | 9/1986 | Buser et al. | |
| 5,064,526 A * | 11/1991 | Rogers | C02F 1/70 208/262.5 |
| 6,217,621 B1 | 4/2001 | Modebelu et al. | |
| 6,498,250 B2 * | 12/2002 | Raets | C08J 11/14 540/540 |
| 6,896,808 B1 | 5/2005 | Jay | |
| 10,875,213 B2 * | 12/2020 | Guha | C01B 32/05 |
| 2009/0133200 A1 | 5/2009 | Mukai et al. | |

FOREIGN PATENT DOCUMENTS

| | | | | |
|---|---|---|---|---|
| WO | 99/60993 A1 | 12/1999 | | |
| WO | WO2017106243 | * | 6/2017 | ........... B09B 3/0016 |

* cited by examiner

*Primary Examiner* — Terressa Boykin
(74) *Attorney, Agent, or Firm* — Porter Wright Morris & Arthur LLP

(57) ABSTRACT

Methods for the recovery of natural fiber-containing material from waste textile and methods for recovery of monomers and/or oligomers from waste plastics comprise contacting about 10 to about 25 wt % of the waste with about 75 to about 95 wt % of an aqueous reagent, the aqueous reagent comprising at least about 80 wt % water and about 20 wt % or less tetraethylene glycol, based on the water and the tetraethylene glycol, and a base, at a temperature of about 90° C. to about 140° C. for about 20 to about 60 minutes to depolymerize polymers in the wastes. The base is included in the aqueous reagent in an amount effective to depolymerize the polymers.

22 Claims, No Drawings

RAPID CHEMICAL METHODS FOR RECOVERY OF MATERIALS FROM WASTE SOURCES

RELATED APPLICATION

The present application claims priority under 35 U.S.C. § 119 of U.S. Application No. 62/920,594 filed May 7, 2019.

FIELD OF THE INVENTION

The present invention is directed to low temperature chemical methods for the recovery of natural fiber-containing material from waste textile, low temperature chemical methods for recovery of monomers and/or oligomers from waste plastics, and low temperature chemical methods for processing of other waste materials.

BACKGROUND OF THE INVENTION

The United States and other countries dispose of millions of tons of waste textiles and plastics in landfills annually. Textile wastes which are commonly generated include, but are not limited to, cotton, polyesters, nylons, rayon, linen, and other fabrics, and a considerable amount of textile waste is composed of cotton and cotton-polyester blends. This growing problem is due to a lack of rapid, environmentally-acceptable and low cost effective recycling methods. Ineffective recycling technology is creating major losses of valuable reusable materials. Chemical methods typically employed to depolymerize polyesters use high temperatures which damage cotton physical strength properties and therefore cannot be employed to process cotton-polyester blends.

Textile wastes are generated from two main sources: post-consumer waste materials, including, for example, garments, vehicle upholstery, household items and the like, and pre-consumer scrap created during textile preparation as well as post-industrial scrap textiles from industrial operations. The need for improved recycling developments for these waste sources are driven by pending regulations, limited landfill space, and the increased cost of raw materials. One major problem is the limited capacities for waste disposal sites. Another important problem is that some discarded fibers can take hundreds of years to decompose, and once in a landfill, may release methane and $CO_2$ gas into the atmosphere.

The US EPA reported in 2014 that most recovered household textiles end up in organizations which sell or donate the majority of these products. After reuse, remaining textiles typically go to a textile recovery facility, are incinerated, or are discarded in landfills. One study in the UK, the Nordics and the Netherlands estimated an average of 61% of textiles are lost to household waste, ending up in landfill or incineration after only one use cycle The remaining 39% are re-used or recycled as second hand clothing. Industrial waste results from the production of yarn, fabrics and other textile products, e.g. selvage from weaving and fabric from factory cutting rooms.

Cotton fiber recycling operations often involve hand sorting textile waste materials by color and type, i.e., fiber content. During the recycling process, cotton waste, for example, is first sorted by type and color and then processed through stripping machines that break the yarns and fabric into smaller pieces before pulling them apart into fiber. The hand separation of fabrics from the millions of tons of textile waste generated annually by color and type is very costly and is not an effective method to advance waste textile recycling. Because of the many available reuses of cotton, there is a need for improved technology to recover this fabric free in a more readily usable form, free of other non-natural fiber-containing materials.

Methods have also been suggested to separate cotton from synthetic fabrics using solvents. Solvent systems have also been developed and used to separate synthetics from cotton to obtain products for reuse. However, some solvent systems, including supercritical fluids, have proven to be costly. Bleaching and reducing agents have been employed to remove dyes. However, these dye-removing agents are not able to effectively remove all dye from fabrics. Solvents also require lengthy processing times, and some are costly and/or are not readily reusable. Solvent systems also have limited processing capabilities.

U.S. Pat. No. 6,498,250 entitled "Process for Nylon Depolymerization" discloses a process in which shredded carpet material is processed at temperatures of 300° C. with superheated steam and pressure to recover caprolactam. In another study conducted by the Department of Applied Chemistry, Harbin Institute of Technology, Harbin China, and Chiba Institute of Technology, nylon is reportedly depolymerized after 30 minutes under conditions of 380° C. and 28 Mpa. However, thermal processes in general consume vast amounts of energy and time and often destroy reusable products. These process conditions are not cost effective to promote widespread recycling of textile waste containing valuable reusable products.

U.S. Pat. No. 5,064,526 discloses a base-catalyzed decomposition (BCD) process for halogenated and non-halogenated organic contaminant compounds contained in a contaminated medium. The BCD process employs an alkali or alkaline earth metal carbonate, bicarbonate or hydroxide and a hydrogen donor compound and heating temperatures between about 200° and 400° C. to cause formation of a free radical hydrogen ion and effect reductive decomposition of the halogenated and non-halogenated organic contaminant compounds.

Most of the existing processes require high temperatures, expensive catalysts, and/or hours of processing time to produce reusable products from discarded waste materials. If textiles, plastics and other materials are to be increasingly recycled, new, innovative, cost effective, rapid and environmentally acceptable technology is required.

SUMMARY OF THE INVENTION

According to the invention, textile waste materials can now be processed to produce reusable natural fabrics such as cotton, free of dyes and polymers. Depending on the composition of the starting waste material, the processes can also produce useful oligomers and/or monomers. Additionally, plastic waste sources can processed to produce useful oligomers and/or monomers using the inventive methods. The methods may also be used to effectively recover chlorophyll, and pigments from plant sources for reuse. The inventive methods may be operated as a batch process or as a continuous process.

The purpose of this invention is to provide new cost effective methods for the recovery of natural fiber-containing materials such as cotton fibers or fabric, and chemicals from the numerous sources of discarded textiles, plastics and composites. New methods have been developed to separate natural fiber-containing materials such as cotton fibers or fabric from synthetics, and to convert a variety of polymeric materials into lower molecular weight valuable products. It is the objective of the present invention to provide methods for the production of valuable products from many waste sources quickly, at lower temperatures, and under simple low-cost processing conditions.

In a specific embodiment, the invention is directed to a method for the recovery of natural fiber-containing material. The method comprises (a) providing a waste textile comprising natural fiber-containing material and at least one polymer component, and (b) contacting about 10 to about 25 wt % of the waste textile with about 75 to about 95 wt % of an aqueous reagent, the aqueous reagent comprising at least about 80 wt % water and about 20 wt % or less tetraethylene glycol, based on the water and the tetraethylene glycol, and a base, at a temperature of about 90° C. to about 140° C. for about 20 to about 60 minutes to depolymerize and remove the at least one polymer component from the natural fiber-containing material, wherein the base is included in the aqueous reagent in an amount effective to depolymerize the at least one polymer component.

In another embodiment, the invention is directed to a method for the recovery of monomers and/or oligomers from a waste plastic comprising a waste polymer, comprising (a) providing a waste plastic comprising a waste polymer, and (b) contacting about 10 to about 25 wt % of the waste plastic with about 75 to about 95 wt % of an aqueous reagent, the aqueous reagent comprising at least about 80 wt % water and about 20 wt % or less tetraethylene glycol, based on the water and the tetraethylene glycol, and a base, at a temperature of about 90° C. to about 140° C. for about 20 to about 60 minutes to depolymerize the waste polymer component to monomers and/or oligomers, wherein the base is included in the aqueous reagent in an amount effective to depolymerize the waste polymer.

In additional embodiments, the methods of the invention also remove dyes and/or other components from the natural fiber-containing materials and from monomers and/or oligomers. The methods employ reaction conditions effective to advance the recovery of valuable reusable products from discarded textiles and plastics.

In specific embodiments, the natural fiber-containing material is separated from the reaction medium, and the reaction medium can be processed to remove separated dyes, polymer decomposition products or the like, when there is an interest to recover such for reuse applications.

This invention helps to eliminate the need for disposal of many materials which are commonly discarded as waste. As the inventive methods employ a base depolymerization, they can be referred to as modified BCD process or M-BCD process.

DETAILED DESCRIPTION

The present invention involves the use of batch or continuous chemical methods for processing waste textiles and waste plastics to recover valuable materials for recycle and reuse. In a specific embodiment, the waste textiles comprise a natural fiber-containing material and at least one polymer component. Examples of the natural fiber-containing material include, but are not limited to, woven fabric, non-woven fabric, fibers, yarns, threads, and the like. Examples of the natural fiber include, but are not limited to, at least one of cotton, flax, hemp, jute, ramie, wool and silk. Examples of the at least one polymer include, but are not limited to, polyesters, polyamines, including nylons, polycarbonates, polylactic acids, and the like. In one embodiment, the textile comprises a natural fiber-containing fabric-polymer blend, such as a cotton-polyester blend. The methods remove polymers and, in more specific embodiments, dyes and/or other attachments such as metals and synthetics, to produce reusable fibers and/or fabrics and chemicals from waste streams. The methods also recover monomers and/or oligomers from waste plastics. The methods are conducted at relatively low temperatures, for example, 90° C.-140° C., and in relatively short times, for example, in 20-60 minutes. In addition to removing polymers, the methods can remove dyes, synthetic materials, metals and the like. Synthetic polymers from the textile materials are converted into monomers, oligomers and other valuable reusable chemical compounds.

For example, in specific embodiments, under processing temperatures of about 90° C.-120° C., natural fiber-containing material, for example, fabric such as cotton-polyester blend fabric, or more specifically, cotton-polyethylene terephthalate blend fabric, is chemically separated from polyester, metals, dyes and other foreign materials in about 20-60 minutes. The physical strength properties of the natural fabric, i.e., a cotton fabric, are not destroyed and the fabric can be reused in new applications.

In additional embodiments, the methods also affect the depolymerize of synthetic polymers in the textile waste or plastic waste to produce reusable chemicals in minutes, i.e., less than an hour, more specifically, within 20-40 minutes, and at low temperatures of 90° C.-140° C. In a specific embodiment, polyester, for example from a natural fiber-polyester blend material or from a waste polymer, is depolymerized to terephthalic acid monomer and oligomers.

The methods of the present invention comprise contacting the waste textile or waste plastic, for example, in a vessel or tank, with an aqueous reagent comprising water, tetraethylene glycol, and a base. Specifically, about 10 to about 25 wt % of the waste textile or waste polymer is contacted with about 75 to about 95 wt % of an aqueous reagent, the aqueous reagent comprising at least about 80 wt % water and about 20 wt % or less tetraethylene glycol, based on the water and the tetraethylene glycol In specific embodiments, the tetraethylene glycol is employed alone or, alternatively, in combination with one or more additional glycols of higher and/or lower molecular weights, including but not limited to, ethylene glycol, and polyethylene glycols of a molecular weight allowing water solubility.

The base may comprise any suitable base that depolymerizes the polymer components. In specific embodiments, the base comprises an alkali metal hydroxide compound or an alkaline earth metal compound, and in a more specific embodiment, the base comprises sodium hydroxide. The base is employed in the reaction medium in an amount effective to depolymerize the polymer components. In a more specific embodiment, the base is employed in at least a stoichiometric amount with respect to the depolymerized components, i.e., that are to be removed from the natural fiber-containing material or result from depolymerization of waste plastics. For example, in a method for removing polyester from a natural fiber-containing textile, and producing oligomers and/or monomer from the removed polyester, the base is added in at least stoichiometric amounts to react with functional groups to produce these monomer and/or oligomer products. When the composition of a natural fiber-polyester blend textile waste to be processed is unknown, the base may first be added in amounts required to depolymerize the weight of polyester which is more commonly present in textiles and in the event that this concentration does not produce the desired reactions, additional base may be added.

In a specific embodiment, the methods of the invention comprise analyzing a sample of the reaction medium formed by the contacting step to measure a content of the polymer component, and adjusting the amount of base in the reaction medium to provide a stoichiometric concentration of the base to sufficient to depolymerize the at least one polymer component. In more specific embodiments, wherein the polymer component comprises a polyester, for example, polyethylene terephthalate, and the base comprises sodium hydroxide, the amount of base in the reaction medium is adjusted to provide a stoichiometric of sodium hydroxide to polyethylene terephthalate of at least 3:1.

The contacting step is conducted at a temperature of about 90° C.-140° C., or, more specifically, about 90° C.-130° C., 90° C.-120° C., 90° C.-110° C., 100° C.-140° C., 100° C.-130° C., or 100° C.-120° C. The contacting is conducted for about 20-60 minutes, or, more specifically, about 20-50, 20-40, 20-30, 30-60, 30-50, or 30-40 minutes.

Dyes are also removed from the natural fiber products and/or monomer and/or oligomer products produced from the waste textiles and waste plastics which are processed according to the present methods. Textiles composed of cotton-polyester blends can be processed in large pieces to remove dyes and polymers such as polyesters, producing cotton fabrics which may be re-dyed for reuse applications. Smaller shredded pieces of textiles or plastics for dye removal-recovery are also suitable for use in the present methods. Upon continued heating in a range of from about 90-140° C., more specifically, up to around 100° C. and slightly above, depolymerization is initiated with release of dyes, metals, and other foreign materials contained in the textile feedstocks undergoing processing. Partial depolymerization of feed stocks rapidly releases metals from the surfaces of waste plastics such as plastic film, composites and other metal-containing materials. Complete depolymerization of polyesters, nylons and other polymeric materials to products oligomers and/or monomers is achieved. In a specific embodiment, depolymerization occurs as the temperature of the reaction medium increases to 120° C. to 130° C. within 10-30 minutes.

In additional embodiments, the recovered natural fiber-containing material is separated from the reaction medium, for example, by centrifugation or filtration. The aqueous reagent may be collected or recovered, and may be repeatedly reused. In specific embodiments, the methods may include additional steps to also recover the components which have been separated from the natural fiber-containing material. For example, the method may further comprise separating the natural fiber-containing material from a reaction medium and removing dye from the reaction medium. The dye may be removed by solvent extraction, distillation, chromatographic methods, and the like.

Additionally, soluble monomers and/or oligomers may be separated from the reaction medium by providing the reaction medium with an acidic pH, for example, by adjusting the reaction medium to a pH below about 6.0, to precipitate the monomers and/or oligomers. For example, when polyethylene terephthalate is depolymerized to terephthalic acid, an insoluble product is obtained by acidifying the reaction medium, and the solid product may be recovered by filtration or centrifugation.

The present invention thus provides methods for rapid and low temperature conversion of pre- and post-consumer waste textiles and waste plastics into reusable products. The methods are also suitable for use in recovering valuable materials from lignin and other natural plant sources.

As a specific example, polyesters such as polyethylene terephthalate (PET) are often blended with natural fibers such as cotton, and widely used as textiles. Current depolymerization methods cannot be employed to separate cotton from polyesters because of high temperature requirements which will destroy the cotton's physical strength properties. Cotton-PET fabric of any size can now, according to the invention, be processed to remove dyes and synthetics.

In a specific embodiment, 1-2 inch pieces of a cotton-PET blend (65-35 weight percent) fabric are placed in a preheated aqueous reagent composed of, by weight, 90% water and 10% tetraethylene glycol. Sodium hydroxide base is employed in excess of stoichiometric amounts required to depolymerize the PET in the fabric. The method is rapidly completed within 20 to 60 minutes at very low temperatures of 90° C. to 110° C. Chemical analysis is employed to establish reagent base concentrations to be employed and time required for production of desired products. The depolymerized polyesters are soluble in the alkaline reagent, and when acid is added in an amount sufficient to provide an acidic pH, monomers and/or oligomers precipitate from the reaction medium and are collected by filtration or centrifugation. The ethylene glycol produced during the depolymerization reactions can be recovered by distillation from the reaction medium when there is build up in concentrations. The chemically removed dyes from processed materials, when accumulated in very high concentrations, can be recovered by water distillation from the reagent to recover released dyes from processed materials. The processing conditions for waste to be recycled are established by sampling and analysis. The base employed can be added into the reagent to establish the concentrations to recover reusable cotton free of PET, dyes, other attachments and to retain fiber reusable physical strength. The complete removal of PET, dyes and other attachment from textiles to recover reusable cotton occurs within 20-60 minutes, more specifically 30-60 minutes, at temperatures of 90 to 140° C., more specifically, 90 to 130° C.

The aqueous reagent employed in the processing of materials can be reused after products are recovered. If additional recycling is to occur, additional base is introduced into the reagent in concentrations in stoichiometric concentration to chemically produce the desired product production established by sampling and analysis.

The specific examples and embodiments described herein are exemplary only in nature and are not intended to be limiting of the invention defined by the claims. Further embodiments and examples, and advantages thereof, will be apparent to one of ordinary skill in the art in view of this specification and are within the scope of the claimed invention.

What is claimed is:

1. A method for the recovery of natural fiber-containing material, comprising (a) providing a waste textile comprising natural fiber-containing material and at least one polymer component, and (b) contacting about 10 to about 25 wt % of the waste textile with about 75 to about 95 wt % of an aqueous reagent, the aqueous reagent comprising at least about 80 wt % water and about 20 wt % or less tetraethylene glycol, based on the water and the tetraethylene glycol, and a base, at a temperature of about 90° C. to about 140° C. for about 20 to about 60 minutes to depolymerize and remove the at least one polymer component from the natural fiber-containing material, wherein the base is included in the aqueous reagent in an amount effective to depolymerize the at least one polymer component.

2. The method of claim 1, wherein the natural fiber-containing material comprises at least one of cotton, flax, hemp, jute, ramie, wool and silk.

3. The method of claim 1, wherein the at least one polymer component comprises a polyester.

4. The method of claim 1, wherein the natural fiber-containing material comprises cotton and the at least one polymer component comprises polyethylene terephthalate.

5. The method of claim 1, wherein the contacting is at a temperature of about 90° C. to about 130° C. for about 30 to about 60 minutes.

6. The method of claim 1, wherein the base comprises an alkali metal hydroxide, an alkaline earth metal compound, or a mixture thereof.

7. The method of claim 1, wherein the base comprises sodium hydroxide.

8. The method of claim 1, further comprising analyzing a sample of a reaction medium formed by the contacting step to measure a content of the at least one polymer component, and adjusting the amount of base in the reaction medium to provide a stoichiometric concentration of the base sufficient to depolymerize the at least one polymer component.

9. The method of claim 8, wherein the at least one polymer component comprises polyethylene terephthalate, the base comprises sodium hydroxide, and the amount of base in the reaction medium is adjusted to provide a stoichiometric of sodium hydroxide to polyethylene terephthalate of at least 3:1.

10. The method of claim 1, wherein the natural fiber-containing material is removed from the reaction medium.

11. The method of claim 10, wherein after the natural fiber-containing material is removed from the reaction medium, the reaction medium is acidified to precipitate monomers and/or oligomers from the depolymerization.

12. The method of claim 10, wherein the waste textile comprises at least one dye that is removed from the natural fiber-containing material, and after the natural fiber-containing material is removed from the reaction medium, dye is removed from the reaction medium.

13. A method for the recovery of monomers and/or oligomers from a waste plastic comprising a waste polymer, comprising (a) providing a waste plastic comprising a waste polymer, and (b) contacting about 10 to about 25 wt % of the waste plastic with about 75 to about 95 wt % of an aqueous reagent, the aqueous reagent comprising at least about 80 wt % water and about 20 wt % or less tetraethylene glycol, based on the water and the tetraethylene glycol, and a base, at a temperature of about 90° C. to about 140° C. for about 20 to about 60 minutes to depolymerize the waste polymer component to monomers and/or oligomers, wherein the base is included in the aqueous reagent in an amount effective to depolymerize the waste polymer.

14. The method of claim 13, wherein the waste polymer comprises polyester, polyamine, polycarbonate, and/or polylactic acid.

15. The method of claim 14, wherein the waste polymer comprises polyester.

16. The method of claim 14, wherein the waste polymer comprises polyethylene terephthalate.

17. The method of claim 13, wherein the contacting is at a temperature of about 90° C. to about 130° C. for about 30 to about 60 minutes.

18. The method of claim 13, wherein the base comprises an alkali metal hydroxide, an alkaline earth metal compound, or a mixture thereof.

19. The method of claim 13, wherein the base comprises sodium hydroxide.

20. The method of claim 13, further comprising analyzing a sample of a reaction medium formed by the contacting step to measure a content of the waste polymer, and adjusting the amount of base in the reaction medium to provide a stoichiometric concentration of the base sufficient to depolymerize the waste polymer.

21. The method of claim 20, wherein the waste polymer component comprises polyethylene terephthalate, the base comprises sodium hydroxide, and the amount of base in the reaction medium is adjusted to provide a stoichiometric of sodium hydroxide to polyethylene terephthalate of at least 3:1.

22. The method of claim 13, wherein the reaction medium is acidified to precipitate monomers and/or oligomers from the depolymerization.

\* \* \* \* \*